(12) United States Patent
Hong

(10) Patent No.: US 8,583,505 B2
(45) Date of Patent: Nov. 12, 2013

(54) SERVICE AUTOMATIC COMPENSATION DEVICE REFLECTING EVALUATION OF PURCHASER

(76) Inventor: Sung-Chan Hong, Seoul (KR)

( * ) Notice: Subject to any disclaimer, the term of this patent is extended or adjusted under 35 U.S.C. 154(b) by 60 days.

(21) Appl. No.: 13/229,082

(22) Filed: Sep. 9, 2011

(65) Prior Publication Data

US 2012/0005035 A1    Jan. 5, 2012

Related U.S. Application Data

(63) Continuation-in-part of application No. 12/530,305, filed on Sep. 8, 2009, now Pat. No. 8,036,947.

(30) Foreign Application Priority Data

Apr. 10, 2007  (KR) ................. 10-2007-0035063
May 17, 2011  (KR) ................. 10-2011-0046351

(51) Int. Cl.
    *G06Q 30/00*    (2012.01)
(52) U.S. Cl.
    USPC ........................................... 705/26.1
(58) Field of Classification Search
    USPC ........................................... 705/26.1
    See application file for complete search history.

(56) References Cited

U.S. PATENT DOCUMENTS 7,657,479 B2    2/2010  Henley
2008/0059215 A1*    3/2008  Boyd ............................ 705/1

FOREIGN PATENT DOCUMENTS

| KR | 10-2000-0037430 | 7/2000 |
| KR | 10-2000-0050014 | 8/2000 |
| KR | 10-2001-0104180 | 11/2001 |
| KR | 10-2002-0037435 | 5/2002 |
| KR | 10-2005-0091203 | 9/2005 |

OTHER PUBLICATIONS

International Search Report—PCT/KR2008/002009 dated Jun. 20, 2008.

* cited by examiner

*Primary Examiner* — Mila Airapetian
(74) *Attorney, Agent, or Firm* — Cantor Colburn LLP

(57) ABSTRACT

Provided is an automatic compensation device including a seller terminal supplying a service and a purchaser terminal purchasing the service, which are connected to each other via a communication network. In more detail, the automatic compensation device calculates a compensation to be provided to a purchaser by using the service evaluation information about a purchased service of the purchaser and the previously-stored purchase credit information about the purchaser, then updates the purchase credit information of the purchaser according to the compensation, and differentially paying an installment to the service supplier according to the compensation.

15 Claims, 9 Drawing Sheets

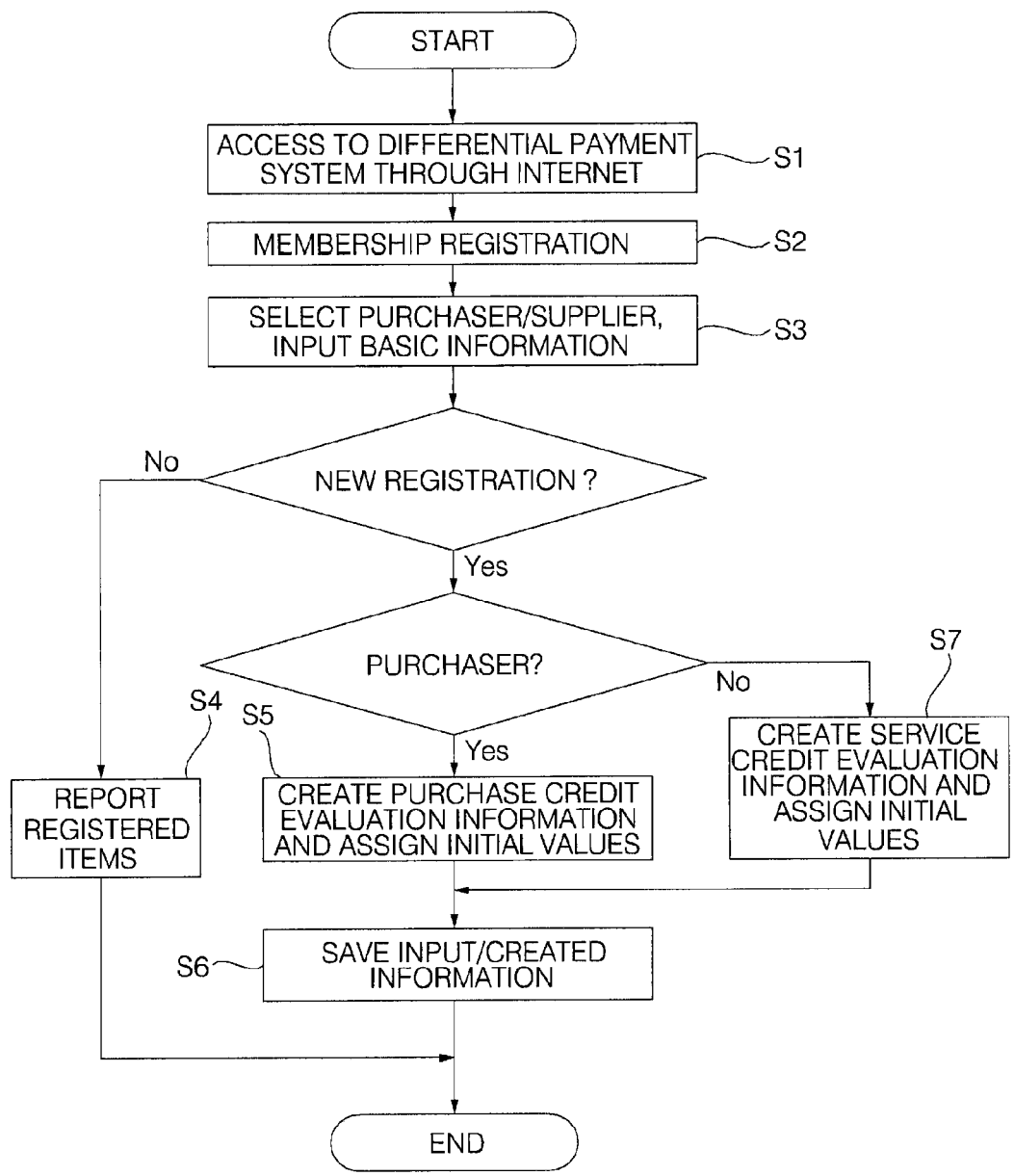

Fig. 4

TOUR PACKAGE BILL PAGE (FOR SUPPLIER)

| SUPPLIER ID : |
|---|
| BUSINESS No : |
| NAME OF PACKAGE : |

| PURCHASER ID : |
|---|
| NAME OF PURCHASER : |

| PAYMENT DUE DATE : _/_/_ |
|---|
| PRE-INSTALLMENT RATE : 75 % |
| PRE-INSTALLMENT RATE : (OFFER) |
| PAYMENT METHOD : CASH |

[ SERVICE LIST FOR BILL ]

| CLASSIFICATION | DETAIL | UNIT PRICE | QUANTITY | PRICE | SERVICE PERIOD | REMARK |
|---|---|---|---|---|---|---|
| AIR FARE | RETURN FARE BETWEEN INCHEON AND PHILIPPIN | - | 2 | - | 3.1 ~ 3.5 | KOREAN AIR. PER 2 PEOPLE |
| HOTEL BILL | PHILIPPIN HOTEL | - | 4 | - | 3.1 ~ 3.5 | PER 4 NIGHTS (PER 2 PEOPLE) |
| LOCAL TRAFFIC EXPENSE | MINI VAN | - | 4 | - | 3.1 ~ 3.5 | PER 4 DAYS |
| GUIDE FEE | LOCAL GUIDE FEE | - | 4 | - | 3.1 ~ 3.5 | PER 4 DAYS. FREE CHARGE |
| TOTAL | | - | - | ₩2,000,000 | 3.1 ~ 3.5 | WITH VAT |

[ SERVICE LIST EXCULDED FROM BILL - LOCAL OPTIONAL ITEMS ]

| CLASSIFICATION | DETAIL | UNIT PRICE | QUANTITY | PRICE | SERVICE PERIOD | REMARK |
|---|---|---|---|---|---|---|
| FOLK VILLAGE | ADMISSION FEE / GUIDE / EXTRA FEE | 100 | 1 | 100 | 3.1 ~ 3.5 | PER PERSON. $ |
| DINNER CRUISE | ADMISSION FEE / SUPPER FEE | 100 | 1 | 100 | 3.1 ~ 3.5 | PER PERSON. $ |
| TOTAL | | - | - | | | |

[ CANCEL ] [ BILL ]

Fig. 5

TOUR PACKAGE PAYMENT PAGE (FOR PURCHASER)

PURCHASER ID : hkd2007
NAME OF PURCHASER : Hong Jil Dong
CREDIT POINT : A (93 Point)

[ LIST FOR BILL ]

| SELECT | NAME OF PACKAGE | SUPPLIER | CHARGE | PAYMENT DUE DATE | PRE-PAYMENT PRICE LIMIT | VAT | PAYMENT METHOD | VIEW DETAIL |
|---|---|---|---|---|---|---|---|---|
| ☐ | PHILIPPINE TOUR | ABC TOUR | ₩800,000 | ~2/26 | ₩700,000↑ | WITH | CASH | DETAIL |
| ☐ | LOCAL DINNER SHOW | XYZ TOUR | ₩500,000 | ~2/27 | ₩450,000↑ | WITH | CASH | DETAIL |
| ☐ | : | : | | | | | | |
| | TOTAL | | ₩1,300,000 | - | ₩1,150,000 | WITH | CASH | |

CANCEL    NEXT

Fig. 7

| PRODUCT REGISTRATION SCREEN | |
|---|---|
| PRODUCT NAME | STEAK P SET |
| AD PHRASE | PREMIUM STEAK: PREMIUM STEAK WITH THE BEST TEXTURE |
| SALES PRICE | 100,000 (₩, WON) |
| COVERAGE RANGE | MON: 50 % TUE: 50 % WED: 50 % THU: 50 % FRI: 30 % 30 SUN: 30 % |
| SERVICE PLACE | S STEAKHOUSE, UNDERGROUND FIRST FLOOR, COEX, SAMSUNG-DONG, GANGNAM-GU |
| EVALUATION AVAILABLE PLACE | WITHIN 2 DAYS AFTER SERVICE RECEPTION |
| PRODUCT IMAGE | [SEARCH] |
| DETAILS | |

[INPUT]

Fig. 8

| SATISFACTION EVALUATION SCREEN | | |
|---|---|---|
| PRODUCT NAME | STEAK P SET | |
| SERVICE DATE | 2011.02.05 18:30. (S STEAKHOUSE, UNDERGROUND FIRST FLOOR, COEX, SAMSUNG-DONG, GANGNAM-GU) | |
| product classification | FOOD > RESTAURANT | |
| SATISFACTION EVALUATION | 1. FOOD SATISFACTION...... 50 (POINT, BASED ON 100)<br>2. MOOD ................. 40 (POINT, BASED ON 100)<br>3. CLEANLINESS....... 40 (POINT, BASED ON 100)<br>4. KINDNESS............. 30 (POINT, BASED ON 100)<br><br>TOTAL : 160POINT<br>(EVALUATION SCORE PERCENTAGE : 40) | |
| COMPLIMENT /IMPROVEMENT REQUEST | | INPUT |

SERVICE AUTOMATIC COMPENSATION DEVICE REFLECTING EVALUATION OF PURCHASER

This application is a Continuation-In Part-Application of U.S. patent application Ser. No. 12/530,305, filed Sep. 8, 2009, which claims priority to and the benefit of Korean Patent Application No. 10-2007-0035063 filed on Apr. 10, 2007 and Korean Patent Application No. 10-2011-0046351 filed on May 17, 2011 in the Korean Patent Office, the entire contents of which are incorporated hereinto by reference.

TECHNICAL FIELD

The present invention relates to a service automatic compensation device determining in advance the compensable range (hereinafter, referred to as a compensation range) within the sales price when a supplier sells the service product. When service products, such as restaurant services, travel services, and beauty services are purchased through e-commerce, the purchaser's satisfaction evaluation of the purchased service will be calculated in when the purchaser's compensation amount is automatically calculated and paid to the purchaser. Additionally, the present invention relates to a differential payment device, paying only the net amount after the deduction of the purchaser's compensation from the sales price to the service supplier.

BACKGROUND ART

Although service products, such as, restaurants, travel products, and beauty salons, are considered to be important and popular in modern society, due to the fact that a purchaser's quality satisfaction is a subjective matter, the disputes between the purchaser and the service suppliers have been increasing. Because of these frequent disputes, the purchasers are losing confidence in small business service suppliers, and as a result, it has become difficult to invigorate service products into the e-commerce industry.

U.S. patent application Ser. No. 12/530,305 (TITLE: SYSTEM AND METHOD FOR DIFFERENTIAL PAYMENT) provides a compensation system that penalizes poor service suppliers, based on the service satisfaction evaluations of the purchasers. The system divides the payments to service suppliers into pre-installment payments and post-installment payments after service provisions. The system also pays the service supplier by differential installments based on the purchaser's service satisfaction evaluation results, and pays the remaining net amount after deducting the purchaser's compensation amount.

However, since U.S. patent application Ser. No. 12/530,305 does not provide a specific method for preventing an "intentional service undervaluation" when a purchaser intentionally undervalues a service in order to increase a compensation for a service, this application provides an integral method and device in consideration of purchaser's compensation.

SUMMARY OF THE INVENTION

An object of the present invention is to provide a service automatic compensation device and method, which automatically calculates/provides compensation if a purchaser is not satisfied with a service. From the results of the purchaser's satisfaction evaluation of the service received, the compensated amount is calculated and deducted from the service payment, so that only the difference will be paid to the supplier. Because the supplier is able to set the limits of the compensation, and since there is a prevention method for intentional service undervaluation, this device is able to satisfy purchasers, service suppliers, and sellers.

To achieve the objects of the present invention, there is provided a service automatic compensation device including a supplier terminal supplying a service and a purchaser terminal purchasing the service, all of which are connected to each other via a communication network. The service automatic compensation device designates a compensable limitation in advance and sells a service, calculates a compensation for a purchaser of the service on the basis of service evaluation information about the service and purchase credit information about the purchaser, updates the purchase credit information according to the compensation, and provides a differential payment to a service supplier according to the compensation.

According to the present invention, the purchaser's buying power is still effective even after the purchase of the service, since the automatic compensation is calculated and paid according to the satisfaction evaluation of the purchaser after the service was received. This encourages service suppliers to improve their service qualities. Additionally, the service automatic compensation device's prevention method for intentional undervaluation from purchasers, results in fair satisfaction evaluations about the services, and decreases unreasonable losses for service suppliers and sellers due to intentional undervaluation, and ultimately encourages service suppliers to more actively participate in the automatic compensation.

DESCRIPTION OF DRAWINGS

FIG. 3 is a flowchart illustrating a process in which a tour package purchaser and a tour package supplier are newly registered to a differential payment system according to an embodiment of the present invention.

FIG. 4 is a view illustrating an input screen for a bill input by a supplier.

FIG. 5 is a view illustrating an input screen on which a differential payment system requires a purchaser to approve bills in a batch based on bills presented by a plurality of suppliers.

FIG. 7 is a view illustrating a screen of a product registered inputted through a supplier terminal according to the third embodiment of the present invention.

FIG. 8 is a view illustrating a satisfaction evaluation input screen in a supplier terminal according to the third embodiment of the present invention.

DETAILED DESCRIPTION OF THE INVENTION

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

First and second embodiments use a travel service product as an example and mainly describe a differential payment part for differentially paying payment to a service supplier according to a service satisfaction evaluation result that a purchaser provides. Their contents are those of U.S. application Ser. No. 12/530,305.

Hereinafter, the present invention will now be described in detail with reference to the accompanying drawing.

First Embodiment

Figure 1:
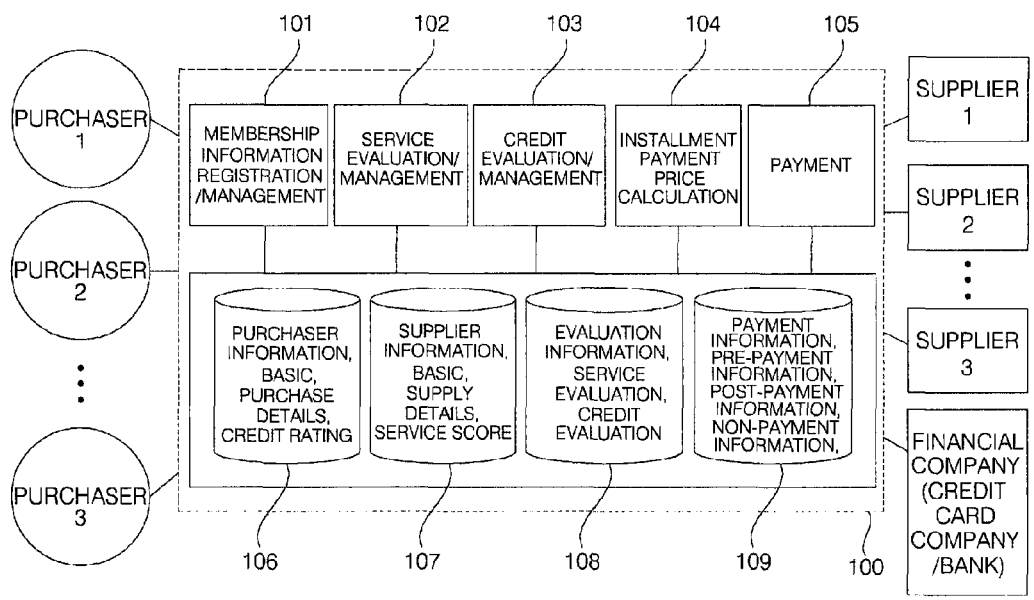
FIG. 1 is a block diagram illustrating an entire configuration according to a first embodiment of the present invention.

FIG. 1 is a block diagram illustrating an entire configuration according to a first embodiment of the present invention. A differential payment system 100 includes a membership information registration/management module 101 managing new registrations and edits, a service evaluation/management module 102, a credit evaluation/management module 103, an installment payment price calculation module 104, a payment module 105, a purchaser information database 106 for storing a purchaser information, a supplier information database 107 for storing a supplier information, an evaluation information database 108 for storing an evaluation information, and a payment information database 109 for storing a payment information. The service evaluation/management module 102 creates the service credit information based on a membership information input through a supplier terminal of a supplier and determines a service evaluation score based on a service evaluation result input through a purchaser terminal after supplying a tour package. The credit evaluation/management module 103 creates a purchase credit based on the membership information about a purchaser input through the purchaser terminal, and updates the purchase credit based on the service evaluation result transmitted through the purchaser terminal by the purchaser. The installment payment price calculation module 104 determines a ratio of a pre-payment price to a post-payment price based on the service credit information and transmits information about the pre-payment price and information about the post-payment price to the supplier terminal, before providing a service. The pre-payment price is paid to the supplier before providing the service, and the post-payment price is paid to the supplier after providing the service. Also, the installment payment price calculation module 104 calculates a differential post-payment price in proportion to the service evaluation score from the post-payment price and transmits information about the differential post-payment price to the supplier terminal, after providing the service. The payment module 105 pays the post-payment price and the differential post-payment price to the supplier in response to a payment requirement input from the supplier terminal. Personal information about the purchaser, purchase details, and the credit rating information are stored in the purchaser information database 106. Basic information about the supplier, supply details, and a service credit rating score are stored in the supplier information database 107. The service evaluation information and the credit evaluation information are stored in the evaluation information database 108. The pre-payment information, the post-payment information, and the non-payment information are stored in the payment information database 109.

Figure 2:
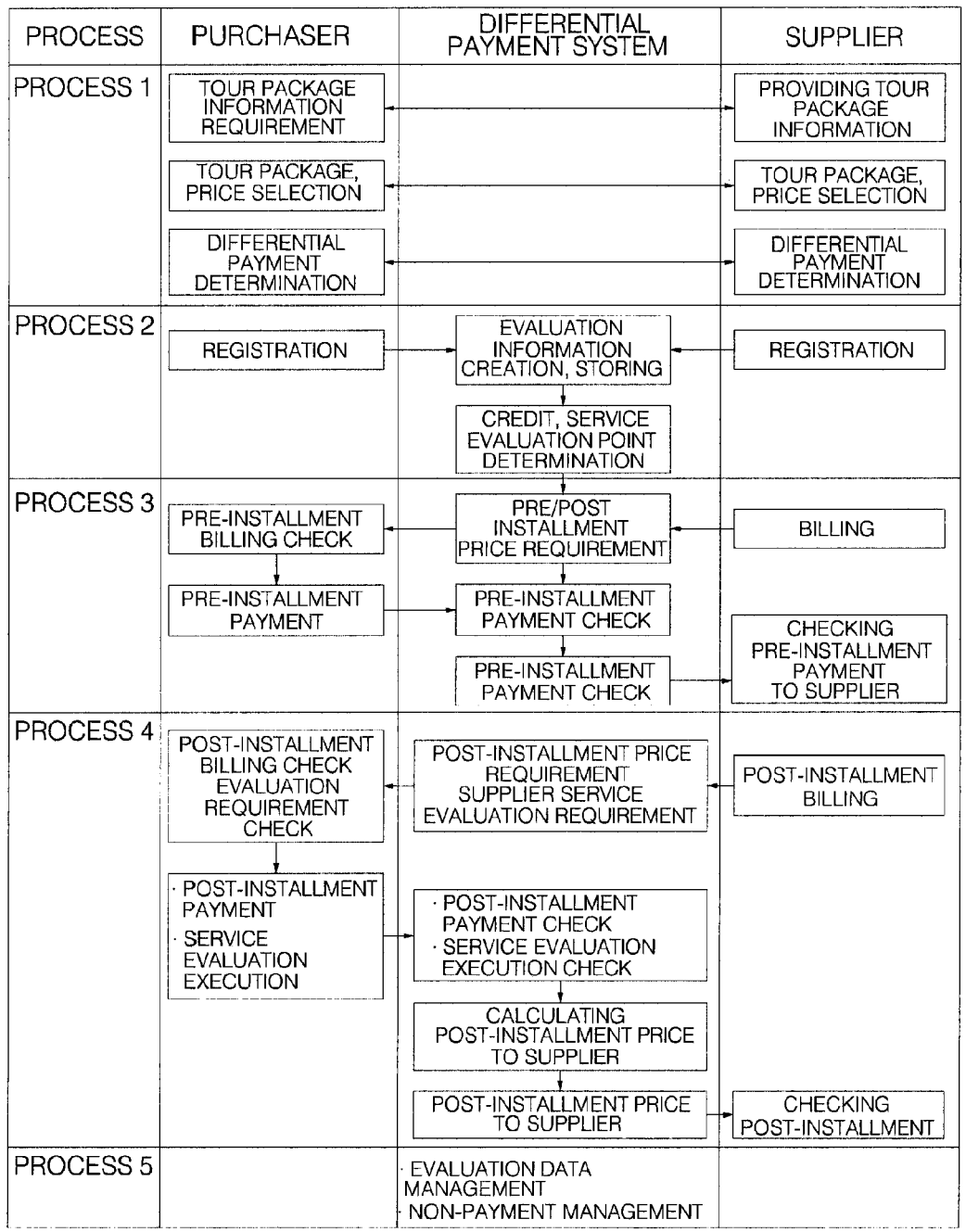
FIG. 2 is a flowchart illustrating a payment process of a differential payment system according to an embodiment of the present invention.

The differential payment system 100 is connected, through a network including the Internet, to purchaser terminals 1, 2 through n, supplier terminals 1, 2 through n, and a computer in a financial company (a credit card company or a bank) used for payment. FIG. 2 is a flowchart illustrating a payment process by a differential payment system according to an embodiment of the present invention, and FIG. 3 is a flowchart illustrating a process in which a tour package purchaser and a tour package supplier are newly registered to a differential payment system according to an embodiment of the present invention.

1) Process 1: Research and Selection of a Tour Package

A tour package purchaser accesses a supplier terminal either through the internet using a purchaser terminal or through the sites of the supplier registered to the differential payment system 100. The purchaser selects a tour package provided by the supplier, and signs a contract such that the payment for the tour package between the supplier and the purchaser is carried out by the differential payment system 100.

2) Process 2: Registration to Differential Payment System

To carry out the payment for the package between the tour package purchaser and the supplier through the differential payment system 100, the tour package purchaser and the supplier should be registered to the differential payment system 100. Referring to FIG. 3, a registration process will now be described. In operation S1, the purchaser and the supplier access a web page of the differential payment system 100 using their own terminals through the Internet. In operation S2, the purchaser and the supplier selects the new registration button on the first page. In operation S3, the purchaser and the supplier inputs basic information including an ID, a social security number, a phone number, and an address and determines whether he/she is a purchaser or a supplier, on the registration page. In operation S4, if the differential payment system 100 identifies him/her as an existing member with reference to the social security number, registered items are reported and the registration process is completed. If he/she is identified as a new member, the differential payment system 100 creates a registration data based on the input information. At this point, if he/she is a purchaser, in operation S5, the purchase credit evaluation information is created and, in operation S6, saved. On the other hand, if he/she is a supplier, in operation S7, the service credit evaluation information is created and saved with respective assigned initial values. Main evaluation items to be created are shown in Table 1 below.

TABLE 1

Purchase Credit/Service Credit Evaluation Items

| CLASSIFICATION | | Service Item | Remark |
|---|---|---|---|
| Purchaser | Purchase Credit Evaluation Item | Registration ID | Purchaser Registration ID |
| | | Purchase Credit Point | Obtained purchase credit points |
| | | | 10 through 100 points (initial value 70 points) |
| | | | Various depending on the number of performing service evaluation and supply points |
| | | Update Date | Date on which purchase credit point is most recently obtained |
| | | The Number Of Performing Service Evaluation | The total number of performing service evaluation (default 0) |
| | | The number Of Service Evaluation Suppliers | The number of supplies on which service evaluation is performed |
| Supplier | Service Credit Evaluation Item | Registration ID | Supplier registration ID |
| | | Service Credit Point | Obtained purchase credit points |
| | | | 10 through 100 points (initial value 70 points) |
| | | | Various depending on service evaluation points determined by purchasers |
| | | Update Date | Date on which service credit point is most recently obtained |
| | | The Number Of Receiving Service Evaluation | The number of receiving service evaluation |
| | | The number Of Service Evaluation Purchasers | The number of purchasers performing service evaluation |

Transactions between two purchasers and two suppliers who are newly registered to the differential payment system 100 will now be described in detail according to the first embodiment of the present invention. Each purchaser has a transaction with one supplier, and the price of the tour package is one million KRW.

Initial values based on values from Table 1 that correspond to the purchasers and the suppliers, are shown in Table 2. Purchaser, Seung-ho Kim has a transaction with supplier, Happy Tour, while purchaser, Young-hee Lee has a transaction with supplier, World Tour.

FIG. 4 is a view illustrating an input screen for a bill input through a supplier terminal by a supplier. The input screen includes the purchaser's information, the name of the service package, the payment due date, the payment method, the service period, service details included in the bill, and optional service items that were excluded in the bill. Here, the tour package supplier may directly propose a pre-installment price, but the proposed pre-installment price should be equal to or less than the pre-installment price based on the service credit point.

TABLE 2

Application of Purchaser's/Supplier's Initial Values in the Differential Payment System

| CLASSIFICATION | ID | Name | Purchase Credit Point | The Number Of Performing Service Evaluation | The number of Suppliers receiving Service Evaluation | Service Credit Point | The Number Of Receiving Service Evaluation | The Number Of Purchasers Performing Service Evaluation | Update |
|---|---|---|---|---|---|---|---|---|---|
| Purchaser | kim001 | Seung-ho kim | 70 | 0 | 0 | — | — | — | Jan. 1, 2007 |
| Supplier | happy001 | Happy Tour | — | — | — | 70 | 0 | 0 | Jan. 6, 2007 |
| Purchaser | lee002 | Young-hee Lee | 70 | 0 | 0- | — | — | — | Jan. 5, 2007 |
| Supplier | world002 | World Tour | — | — | — | 70 | 0 | 0 | Jan. 8, 2007 |

Each of the purchase credit points is used as a reference for determining a pre-payment price and a post-payment price that are paid by the purchaser. Each of the service credit points is used as a reference for determining a ratio of a pre-installment price to a post-installment price, which are paid to the supplier by the differential payment system 100.

3) Process 3: Pre-Installment Payment

The supplier registers and logs into the differential payment system 100 through the supplier terminal, and then requires the differential payment system 100 to approve a bill.

When the differential payment system 100 receives the bill proposed by the supplier, the differential payment system 100 calculates pre/post-installment prices. References for calculating rates of the supplier pre/post-installment prices based on the service credit points of the suppliers and the rates of the supplier pre/post-installment prices are shown in Table 3 below.

TABLE 3

Rates Of Pre/Post-installment Prices Based On The Service Credit Point

| Service Credit Point | Level | Rate of pre-installment (%) | Rate of post-installment (%) | Total (%) | Application |
|---|---|---|---|---|---|
| 95-100 | A+ | 90 | 10 | 100 | 1) Happy Tour(Total: one million won) |
| 90-95 | A | 87 | 13 | 100 | Service Credit Point: 70 points |
| 85-90 | B+ | 84 | 16 | 100 | Pre-installment price: 7.5 million won |
| 80-84 | B | 81 | 19 | 100 | Post-installment price: 2.5 million won |
| 75-79 | C+ | 78 | 22 | 100 | 2) World Tour (Total: one million won) |
| 70-74 | C | 75 | 25 | 100 | Service Credit Point: 70 points |
| 65-69 | D+ | 72 | 28 | 100 | Pre-installment price: 7.5 million won |
| 60-64 | D | 69 | 31 | 100 | Post-installment price: 2.5 million won |
| 55-59 | E+ | 66 | 34 | 100 | |
| 50-54 | E | 63 | 37 | 100 | |
| Below 50 | F | 60 | 40 | 100 | |

According to Table 3, Happy Tour and World Tour, each receives 7.5 million won, and the balances of 2.5 million won are differentially paid based on service results of the two suppliers.

When the supplier inputs data and then presses the requirement button, the installment payment price calculation module 104 of the differential payment system 100 creates a pre-payment bill payment requirement data to the purchaser based on a bill data input by the supplier and the purchase credit point. Rates of the pre-payment prices of the purchasers are differentially determined depending on purchase credits of the purchasers. How the rates (%) of the pre-payment prices are determined by the purchase credits are show in Table 4.

TABLE 4

Rates (%) Of Pre-Payment Prices Of Purchasers Determined By Purchase Credits

| Service Credit Point | Level | Rate of pre-installment (%) | Application |
|---|---|---|---|
| 95-100 | A+ | The same as that of pre-installment of supplier | 1) Seung-ho Kim |
| 90-95 | A | Rate of pre-installment of supplier (%) + Rate of Post-installment of supplier (%) × 0.25 | Purchase Credit Point: 70 points Credit Level: C |
| 85-90 | B+ | Rate of pre-installment of supplier (%) + Rate of Post-installment of supplier (%) × 0.50 | Rate Of Pre-Payment: 100% 1) Young-hee Lee |
| 80-84 | B | Rate of pre-installment of supplier (%) + Rate of Post-installment of supplier (%) × 0.75 | Purchase Credit Point: 70 points Credit Level: C |
| 75-79 | C+ | Total Bill of 100% | Rate Of Pre-Payment: 100% |
| 70-74 | C | | |
| 65-69 | D+ | | |
| 60-64 | D | | |
| 55-59 | E+ | | |
| 50-54 | E | | |
| Below 50 | F | | |

When a plurality of tour package suppliers including: a tour package supplier dealing airline tickets, hotels, and local traffics; and a tour package supplier dealing local leisure events, bill a purchaser, the differential payment system 100 creates a bill data such that the purchaser selects bills to pay the bills in a bundle. FIG. 5 is a view illustrating a batch-billing page presented by a plurality of suppliers. When a purchaser approves a bill after logging in the differential payment system 100, the differential payment system 100 checks and reports a payment result to a terminal of each supplier, and then pays pre-installment prices presented by the suppliers. According to this example, the differential payment system 100 sends 7.5 million won to each Happy Tour and World Tour.

4) Process 4: Post-Installment Payment

When the purchaser logs into the differential payment system 100 through the purchaser terminal after the service period of the tour package is over, the differential payment system 100 provides the post-payment bills and the service evaluation input page. In cases like in the example, where both purchasers paid the pre-payment prices of 100%, the purchasers will only execute the service satisfaction evaluation input page.

If the purchasers do not execute the service satisfaction evaluation within a predetermined time period, a default value is automatically selected. The differential payment system 100 calculates differential post-installment prices to be paid to the suppliers based on service evaluation result data according to an evaluation method as shown in Table 5 below.

TABLE 5

Supplier Service Evaluation Items and Evaluation Method

| Classification | | Service Item | Weight | Evaluation Method |
|---|---|---|---|---|
| (1) Observance Index in Service | Observance Index in Pre-notified Service | Guide/Local Pickup Service | 10 | Excellent: 10 points |
| | | Hotel Service: Pre-notified Hotel Usage, Check-in, and Check-out | 40 | Pretty Good: 8 points Good: 7 points Fair: 6 points |
| | | Observance of Itinerary | 30 | Poor: 5 points |
| | | Pre-notified Free Service | 20 | Bad: 3 points |
| (2) Purchaser Satisfaction Index | Satisfaction Index expressed by Purchaser | Consultation and Information (Previous/Local) | 10 | |
| | | Comfortableness of Itinerary (Consideration for Purchaser) | 30 | |
| | | Local Traffic and Reservation | 20 | |
| | | Whole Service for Price | 40 | |
| Weakness index in Service | Point Deduction: Deducted from Sum of (1) and (2) | Touting of Non-notified Optional Item | -2 | The number of evaluation * Weight * Price Weight [note 1] |
| | | Peremptory sale | -2 | |
| | | Unkindness (Supplier and Guide) | -2 | Over Good: 0 point |
| | | Dissatisfaction/No Response to Suggestion | -1 | Improvement Recommend: 0.5 point Improvement Need: 1.0 point Measure Need: 2.0 point |

[note 1] Price Weight: Expense Caused by Touting, Below 0.1 million won: 1 point, and 0.2 point increase per 0.1 million won increase.

When the purchaser completes the service satisfaction evaluation through the purchaser terminal, the service evaluation/management module 102 of the differential payment system 100 calculates a service evaluation score for the corresponding supplier based on an input data. Applications of an evaluation data of the two purchasers and service evaluation scores obtained by Happy Tour and World Tour based on the evaluation data are shown in Table 6 below.

According to the application, Happy Tour and World Tour obtained a service evaluation score of 92 points and a service evaluation score of 71 points, respectively. The differential post-installment prices are calculated based on the service evaluation scores. A method of calculating the differential post-installment prices based on the service evaluation scores and the purchase credit point (level) is shown in Table 7 below.

TABLE 6

Application of Service Evaluation Score

| Supplier | | Service | Obtained Score | Weight | Total | Conversion Score 100 | Evaluator |
|---|---|---|---|---|---|---|---|
| Happy Tour | Observance Index in Service | Guide/Local Pickup Service | 10 | 10 | 100 | 5 | Seung-ho Kim |
| | | Hotel Service | 10 | 40 | 400 | 20 | |
| | | Observance of Itinerary | 10 | 30 | 300 | 15 | |
| | | Pre-notified Free Service | 10 | 20 | 200 | 10 | |
| | Purchaser Satisfaction Index | Consultation and Information | 8 | 10 | 80 | 4 | |
| | | Comfortableness of Itinerary | 8 | 30 | 240 | 12 | |
| | | Local Traffic and Reservation | 10 | 20 | 200 | 10 | |
| | | Whole Service for Price | 8 | 40 | 320 | 16 | |
| | Weakness Index in Service | Touting of Non-notified Optional Item: None | = 0 × (−2) × 1 | | 0 | 0 | |
| | | Peremptory Sale: None | = 0 × (−2) × 1 | | 0 | 0 | |
| | | Unkindness: Good | = 0 × (−2) | | 0 | 0 | |
| | | Dissatisfaction/No Response to Suggestion: Good | = 0 × (−1) | | 0 | 0 | |
| | Total | | 74 | 200 | 1,840 | 92 | |
| World Tour | Observance Index in Service | Guide/Local Pickup Service | 10 | 10 | 100 | 5 | Young-hee Lee |
| | | Hotel Service | 10 | 40 | 400 | 20 | |
| | | Observance of Itinerary | 8 | 30 | 240 | 12 | |
| | | Pre-notified Free Service | 8 | 20 | 160 | 8 | |
| | Purchaser Satisfaction Index | Consultation and Information | 8 | 10 | 80 | 4 | |
| | | Comfortableness of Itinerary | 6 | 30 | 180 | 9 | |
| | | Local Traffic and Reservation | 8 | 20 | 160 | 8 | |
| | | Whole Service for Price | 6 | 40 | 240 | 12 | |
| | Weakness Index in Service | Touting of Non-notified Optional Item: 1 time × 0.1 million wons | = 1 × (−2) × 1 | | −2 | −2 | |
| | | Peremptory Sale: 1 time × 0.1 million wons | = 1 × (−2) × 1 | | −2 | −2 | |
| | | Unkindness: Improvement Need | = 1 × (−2) | | −2 | −2 | |
| | | Dissatisfaction/No Response to Suggestion: Improvement Need | = 1 × (−1) | | −1 | −1 | |
| | Total | | 68 | 200 | 1,553 | 71 | |

TABLE 7

Calculating of Differential Post-Installment Prices Based on Service Evaluation Scores and Purchaser Credit

| Service Evaluation Score (point) | Evaluation Payment Rate (a) | Purchaser Credit (Level) | Credit Payment Rate (b) | Calculation of Post-installment price |
|---|---|---|---|---|
| Over 80 | 1.0 | Over A | 1.0 | =Post-installment |
| 75-79 | 0.9 | B+ | 0.9 | total price (c) × |
| 70-74 | 0.8 | B | 0.8 | Evaluation |
| 65-69 | 0.7 | C+ | 0.7 | Payment Rate (a) + |
| 60-64 | 0.6 | C | 0.6 | β * β: c × (1 − |
| 55-59 | 0.5 | D+ | 0.5 | a) × (1 − b) |
| 50-54 | 0.4 | D | 0.4 | |
| 40-49 | 0.3 | E+ | 0.3 | |
| Below 40 | 0.2 | E | 0.2 | |
| | | Below F | 0.1 | |

Referring to Table 7, the differential post-installment prices are 2.5 million won (=2.5 million won (c)×1.0(a)+0 (β)) for Happy Tour and 2.2 million won (=2.5 million won (c)*0.8+(25*0.2*0.4) for World Tour, respectively.

In order to prevent the purchaser from deliberately lowering the service evaluation score to minimize the differential post-installment price, the service evaluation score is linked with the purchase credit point of the purchaser. That is, when the service evaluation score is lowered, the purchase credit point is also lowered. Thus, when the purchaser purchases a tour package in the future, the authority and influence the purchaser has on the installment payment price are decreased.

Table 8 shows the changes in the supplier's and purchaser's credit points based on the service evaluation score.

TABLE 8

Changes of Supplier and Purchaser Credit Points Based on Service Evaluation Score

| Service Evaluation Score (Top Conversion Score of 100) | Purchase Credit Point of Purchaser | Supplier Credit Point | Remark |
|---|---|---|---|
| 80 or more | Existing Point + a | Existing Point + (c * d) | a: 1 time (+1), 2 times (+2), 3 times or more (+3) |
| Below 80 | Existing Point − b | | b: (1 − Corresponding Evaluation Payment Rate) × 10 |
| | | | c: 90 points or more (+2 points) |
| | | | 80-89 points (+1 point) |
| | | | 70-79 points (−1 point) |
| | | | 60-69 points (−2 points) |
| | | | d: weight based on the number of evaluation |
| | | | 1-9 times: 0.1 |
| | | | 10-19 times: 0.2 |
| | | | 20-30: 0.3 |

Factors for determining the purchase credit point and the service credit point include a price linked with an evaluation score, an evaluation score distribution of a purchaser during a predetermined time period, and an evaluation mean score. In this embodiment, calculation is performed based on the service evaluation score and the number of evaluating, which are the most sensitive factors.

Referring to Table 8, changed purchase credit points of the two purchasers, Seung-ho Kim and Young-hee Lee are 71 points (=70 points+1 point) and 68 points (=70 points−(1−0.8)×10), respectively. Also, changed service credit points of the two suppliers, Happy Tour and World Tour are 70.2 points (=70 points+(2*0.1)) and 69.9 points (=70 points+(−1*0.1)), respectively.

Unpaid balance, that is, the difference between the post-installment price and the differential post-installment price based on an evaluation result, is added to purchaser' mileage to be used to purchase a tour package or pay a broker fee.

Second Embodiment

Hereinafter, a second embodiment of the present invention will now be described.

According to the first embodiment, the post-installment prices are differentially paid. According to the second embodiment, a post-installment price is divided into a basic payment price and a differential payment price, thereby decreasing influence of a service evaluation score and reflecting the service credit point of a supplier in calculating of the post-installment price.

According to the second embodiment, the basic payment price is completely paid to the suppliers, corresponding to a basic payment rate (%), but the differential payment price is differentially calculated and paid corresponding to a differential payment rate (%) based on a service evaluation result of a corresponding tour package by a purchaser. A method of calculating the basic payment rate (%) and the differential payment rate (%) is shown in Table 9 below.

TABLE 9

Calculation of Basic/Differential Payment Rates (%) of Post-Installment Price

| Item | Calculation Method |
|---|---|
| Basic Payment Price Rate (%) | A: (Purchase Credit Point of Purchaser/Service Credit Point of Supplier) |
| | A ≥ 1.6: Basic Payment Price Rate % = 20% |
| | 0.4 < A < 1.6: Basic Payment Price Rate % = A × 0.5 × 100 (%), round off for the nearest hundredth |
| | A ≤ 0.4: Basic Payment Price Rate % = 80% |
| | Range of Basic Payment Price Rate: 20-80% |
| Differential Payment Price Rate (%) | '100%-Basic Payment Price Rate %' |
| | Range of Differential Payment Price Rate: 20-80% |

Referring to Table 9, Happy Tour and World Tour each has a basic payment price rate of 50% and a differential payment price rate of 50%. When service evaluation scores of the both suppliers are the same as those of the first embodiment, the post-installment prices to be paid are 2.5 million won (=12.5+(12.5×1.0+0)) for Happy Tour and 2.35 million won (=12.5+(12.5×0.8+(12.5×0.2×0.4))) for World Tour. That is, it can be noted that influence of service evaluation by the purchaser is decreased in comparison with 2.2 million won for World Tour according to the first embodiment.

Third Embodiment

According to the first and second embodiments, the term, the service supplier, is used to describe that a payment is differentially paid to a supplier providing a service according to the service satisfaction of a purchaser. However, in an actual e-commerce, a service supplier may be a seller or may be different from the seller. According to this embodiment, a term, a seller, is used in order to describe a compensation device compensating a purchaser for a purchased service.

Figure 6:
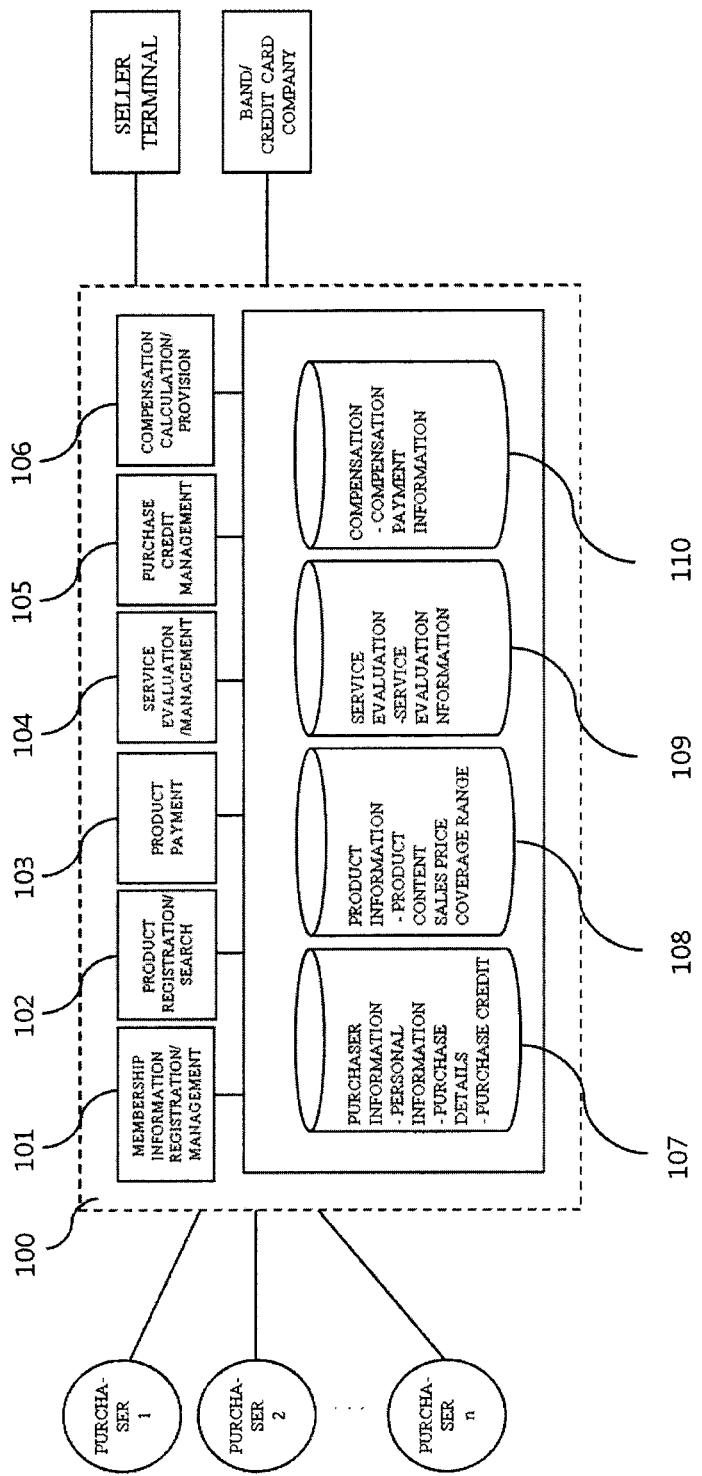
FIG. 6 is a block diagram illustrating an entire confirmation according to a third embodiment of the present invention.

FIG. 6 is a block diagram illustrating the entire configuration according to a third embodiment of the present invention.

First, a seller terminal selling a service is connected to a purchaser terminal purchasing a service via a communication network.

An automatic compensation device 100 includes a membership information registration/management module 101 registering and editing information of purchasers, a product registration/search module 102 storing service product information that a seller inputs and displaying information on a purchaser terminal when a purchaser searches a service product, a product payment module 103 purchasing a service product selected by a purchaser, a service evaluation/management module 104 calculating a service evaluation score according to a service evaluation result inputted through a purchaser terminal after a purchaser obtains a service, a purchase credit management module 105 generating an initial purchase credit by using the member information of a purchaser inputted through a purchaser terminal and updating the purchase credit according to a service evaluation result transmitted through a purchaser terminal, a compensation calculation/provision module 106 calculating a compensation by reflecting a compensation range inputted through a seller terminal and a purchase credit and a service evaluation score of a purchaser and then providing the compensation to a purchaser, a purchaser information database 107 storing personal information, purchase credit, and purchase details, a product information database 108 storing the product information, sales price, and compensation range information of a service product that a seller inputs, a service evaluation database 109 storing service evaluation information, and a compensation database 110 storing payment information about a compensation for a purchaser.

Additionally, the automatic compensation device 100 is connected to financial institutions (credit card companies or banks) for payments of purchase terminal 1, 2, . . . , n via a communication network.

(STEP-1: Registration of Products to be Sold)

Through a seller terminal, a seller first registers a product to be sold in the automatic compensation device 100. FIG. 7 is a view illustrating an input screen of the registered product on the seller terminal. The seller inputs a compensation range % and a service evaluation period, in addition to general items such as a product name "Steak P set", a promotional phrase "Premium steak with the best texture", a sales price "₩ 100,000", a service location "S-steakhouse, 101 24$^{th}$ Street, San Jose", a product image, and details. The compensation range % may vary depending on the day of the week. For example, the compensation range % may be 50% for Mondays through Thursdays, and 30% for Fridays through Sundays. According to this, the compensation range % can have a promotion effect on each day, by increasing the compensation range % for days that have low usage, like weekdays, and by decreasing the compensation range % for days that have high usage, like weekends. A service evaluation period designates a period that a purchaser evaluates a service after obtaining the service.

In FIG. 7, the designated time frame for the service evaluation is set to 2 days. In this case, if the service evaluation is not submitted within 2 days after the service is provided, automatically an evaluation score, i.e., satisfaction, is inputted and no compensation is provided. Once a score is inputted and an input button is pressed, the product registration/search module 102 stores the inputted information in the product information database 108.

(STEP-2: Product Search, Payment, and Store Use)

The product registration/search module 102 allows a purchaser to search and select a service product through a purchaser terminal. The third embodiment describes a case where a newly registered purchase member, Purchaser A, firstly purchases a product of a steak P set (sales price: ₩ 100,000).

The product payment module 103 is connected to computers of a bank and a credit card company and allows a purchaser to pay the bill for the selected steak P set (sales price: ₩ 100,000) through various methods such as a credit card and on-line transfer. Additionally, the product payment module 103 stores purchase detail information in the purchaser information database 107 and sends a ticket through a mobile device or e-mail, so that the purchaser may use it in the store.

When a purchaser presents a ticket to a store and receives a service, a seller inputs a ticket number in a seller terminal to register a date that the purchaser received the service. (In cases where a seller is not a service supplier, the ticket number may be inputted through a service supplier terminal.)

(STEP-3: Service Satisfaction Evaluation Input of Purchaser)

A purchaser may provide a satisfaction evaluation through a purchaser terminal within a service evaluation period. FIG. 8 is a view illustrating a satisfaction evaluation input screen displayed on a purchaser terminal. The satisfaction evaluation input screen includes a product name, service date, a product classification, a satisfaction evaluation input item, and a compliment/improvement request input item. The service evaluation/management module 104 displays a satisfaction evaluation input screen on a purchaser terminal according to an evaluation implementation request signal of the purchaser terminal and obtains appropriate evaluation items from the service evaluation database 109 according to a product classification to display them.

In FIG. 8, scores of 0 to 100 are inputted based on four items of food satisfaction, taste, environment, sanitation, and kindness, the satisfaction evaluation can also be based on five level selection evaluations of "very satisfied", "satisfied", "average", "unsatisfied", and "very unsatisfied". When a purchaser presses an input button after evaluation input, the service evaluation/management module 104 converts the inputted evaluation information into an evaluation score according to a predetermined reference, stores the evaluation score in the service evaluation database 109, and then delivers the evaluation score to the compensation calculation/provision module 106.

The service evaluation/management module 104 checks whether an evaluation implementation request signal is received from a purchaser terminal within a service evaluation period. If the service evaluation period expires without the evaluation implementation request signal, the service evaluation/management module 104 automatically sets an evaluation score as a predetermined reference satisfaction score (80 points in this embodiment).

(STEP-4: Compensation Calculation According to Satisfaction Evaluation)

The compensation calculation/provision module 106 reflects four items of a purchase credit, a compensation range, a purchase amount, and an evaluation score during a compensation calculation.

First, in relation to the purchase credit, when a purchaser is subscribed as a purchase member initially, the purchase credit management module 105 provides a new purchase member with a purchase credit of 50%(=0.5). The purchase credit is increased or decreased according to a satisfaction evaluation of a purchaser and, when it is more than 100%(=1.0), 100% (=1.0) is reflected to calculation.

Moreover, a compensation range % and a purchase price are reflected to calculation as it is. In a case of an evaluation score, after a total evaluation score is converted into a percentage, if the percentage is more than or equal to 80 points, i.e., a predetermined reference satisfaction score, it is regarded as satisfactory, so that no compensation is calculated. If the percentage is less than 80 points, (100−evaluation score percentage)/100 is reflected to the compensation.

In FIG. 8, since 160 points for four items are obtained, an evaluation score percentage is 40 and an actual value applied to the calculation is 0.6 (=(100−40)/100).

A compensation calculation equation according to the above reference is as follows and Table 10 represents a compensation simulation when a new purchase member of a 50% purchase credit inputs various evaluation scores about a ₩ 100,000 service product with a 50% compensation range.

(compensation)=(purchase credit%)*(compensation range %)*(purchase price)*(100−evaluation score percentage)/100   [Equation 1]

TABLE 10

Compensation Simulation - 50% purchase credit based on a ₩100,000 service product

| Evaluation Score Percentage | Compensation Range | Purchase Price | Calculated Compensation | Calculation Equation |
|---|---|---|---|---|
| 100 | 50% (=0.5) | ₩100,000 | n/a | — |
| 90 | 50% (=0.5) | ₩100,000 | n/a | — |
| 80 | 50% (=0.5) | ₩100,000 | n/a | — |
| 70 | 50% (=0.5) | ₩100,000 | ₩7,500 | = 0.5 * 0.5 * ₩100,000 * (100 − 70)/100 |
| 60 | 50% (=0.5) | ₩100,000 | ₩10,000 | = 0.5 * 0.5 * ₩100,000 * (100 − 60)/100 |
| 50 | 50% (=0.5) | ₩100,000 | ₩12,500 | = 0.5 * 0.5 * ₩100,000 * (100 − 50)/100 |
| 40 | 50% (=0.5) | ₩100,000 | ₩15,000 | = 0.5 * 0.5 * ₩100,000 * (100 − 40)/100 |
| 30 | 50% (=0.5) | ₩100,000 | ₩17,500 | = 0.5 * 0.5 * ₩100,000 * (100 − 30)/100 |
| 20 | 50% (=0.5) | ₩100,000 | ₩20,000 | = 0.5 * 0.5 * ₩100,000 * (100 − 20)/100 |
| 10 | 50% (=0.5) | ₩100,000 | ₩22,500 | = 0.5 * 0.5 * ₩100,000 * (100 − 10)/100 |
| 0 | 50% (=0.5) | ₩100,000 | ₩25,000 | = 0.5 * 0.5 * ₩100,000 * (100 − 0)/100 |

In FIG. 8, when a percentage of a satisfaction evaluation score by a purchaser A is 40 and the purchaser A receives a service during Monday to Thursday of a 50% compensation range, the purchaser A receives a ₩ 15,000 compensation for dissatisfaction.

The compensation calculation/provision module 106 may provide the calculated compensation to a purchaser with various methods such as mileage accumulation and virtual account transfers. In the third embodiment, detailed descriptions of payment means will be omitted. Additionally, the compensation calculation/provision module 106 stores the provided compensation information in the compensation database 110.

(STEP-5: Purchase Credit Update, Intentional Undervaluation Prevention of Purchaser)

Figure 9:
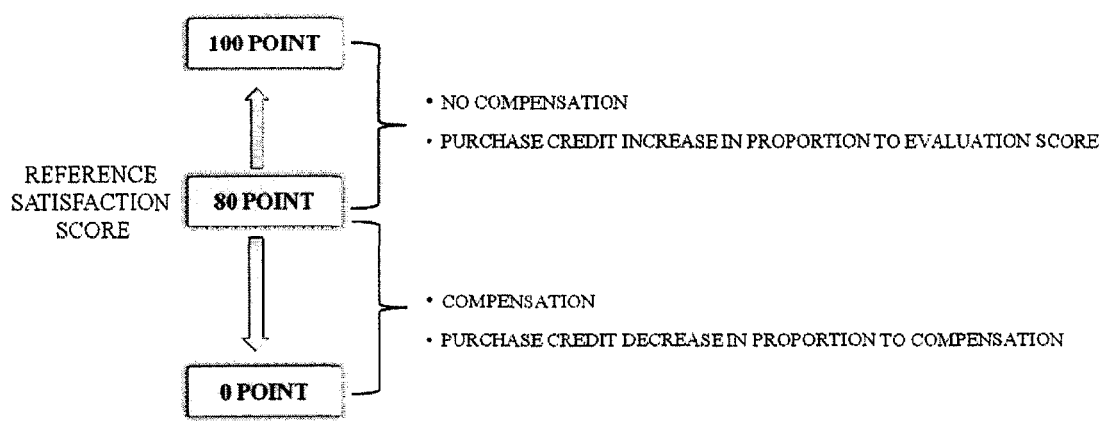
FIG. 9 is a view illustrating a variation reference of a purchase credit according to the third embodiment of the present invention.

The compensation calculation/provision module 106 transmits satisfaction evaluation scores and compensation payment information after compensation payment to the purchase credit management module 105 and the purchase credit management module 105 changes a purchase credit based on FIG. 9. That is, the purchase credit is increased if it is more than or equal to a predetermined reference satisfaction score, i.e., 80 points (no compensation is provided), and the purchase credit is decreased if it is less than the predetermined reference satisfaction score. Table 11 represents a purchase credit variation equation according to an evaluation score and compensation.

TABLE 11

Evaluation Score and Purchase Credit Variation Equation according to the Evaluation Score and Compensation

| Evaluation Score | Compensation | Purchase Credit Variation Equation | Remark |
|---|---|---|---|
| More than or equal to 80 points | No | +(evaluation score weight) * (purchase price)/ (reference cost1) ※(evaluation score weight) = evaluation score percentage/100 | reference cost 1 = ₩50,000 |
| Less than 80 points | No | −(compensation)/ (reference cost2) | reference cost 2 = ₩5,000 |

In Table 11, a purchase credit according to compensation payment is decreased by 1% per ₩ 4,000 (reference cost 2). This means that the purchase credit of 50% that a new purchase member receives affects a compensation calculation per each case and also a total compensation limitation that a purchase member can receive is ₩ 250,000(=₩ 5000*50). That is, since a total compensation is identical either with one time of ₩ 200,000 and ten times of ₩ 10,000, a purchaser does not need to undervalue a satisfactory service unnecessarily.

Moreover, as a purchase credit is increased with no compensation, a total compensation limitation is increased. As a result, a higher compensation is calculated with the same evaluation score during the next evaluation. Additionally, a purchaser can effectively manage a purchase credit to receive the maximum compensation if necessary.

According to the third embodiment, since the purchaser A receives a ₩ 15,000 compensation, the purchase credit of the purchaser A becomes 47% reduced by −3% (=−₩ 15,000/ ₩ 5,000).

Table 12 shows a comparison between two cases that purchase service products that are under the same condition, continuously for two transactions. In the first case, the purchaser is unsatisfied and receives compensations for both transactions. In the second case, the purchaser is satisfied and receives no compensation for the first purchase, but is unsatisfied and receives a compensation for the second purchase. The changes in the compensation and purchase credit are based on the compensation calculation equation [Equation 1] and shown in Table 11.

TABLE 12

Comparison of Two Continuous Purchases of Service Products Under the Same Condition

| Service Product | Classification | First Purchase (satisfactory) | | | Second Purchase (unsatisfactory) | | |
|---|---|---|---|---|---|---|---|
| | | Evaluation Score | Compensation | Purchase Credit | Evaluation Score | Compensation | Purchase Credit |
| Cost: ₩100,000 50% compensation range | CASE-1 | 40 points | ₩15,000 | 47% (−3.0%) | 40 points | ₩14,100 | 44.2% (−2.8%) |
| | CASE-2 | 80 points (automatic evaluation) | — | 51.6% (+1.6%) | 40 points | ₩15,480 | 48.5% (−3.1%) |

Shown in Table 12, although the unsatisfactory second purchase evaluation scores are the same for both CASE-1 and CASE-2, the second purchase's compensation amount is about 10% less for CASE-1 than CASE-2. Also, in CASE-1, although the evaluation score is identical for the first purchase and the second purchase, the compensation amount for the second purchase is less than the compensation amount for the first purchase. Therefore, a purchaser's right providing a penalty to an unsatisfying service supplier is weakened by itself.

Moreover, in terms of compensations, CASE-1 received a total compensation of ₩ 29,100, and CASE-2 received a total compensation of ₩ 15,480. Although CASE-1 received ₩ 13,620 more in compensation than CASE-2, its purchase credit is 44.2%, while CASE-2 has a purchase credit of 48.5%. Therefore, the purchase credit of CASE-2 is higher by 4.3%, giving CASE-2 the right to receive ₩ 21,500 (=4.3%*₩ 5,000) more in compensation than CASE-1, and this is advantageous for a purchase consequently.

Next, an additional consideration for a purchase credit change is to prevent the undervaluation of a high cost product when a purchaser wants to receive a large amount of compensation at one time. Table 13 shows a purchase credit variation equation adjusted by reflecting an amount weight based on Table 12.

TABLE 13

Purchase credit variation equation reflected with product price weight

| Evaluation Score | Compensation | Purchase Credit Variation Equation | Remark |
|---|---|---|---|
| More than or equal to 80 points (reference satisfaction score) | No | +(evaluation score weight) * (purchase price)/(reference cost 1) ※(evaluation score weight) = evaluation score percentage/100 | Reference cost 1 = ₩50,000 |
| 40 points to 79 points | Yes | −(compensation)/(reference cost 2) | Reference cost 2 = ₩5,000 |
| 0 point to 39 points | Yes | −(compensation)/(reference cost 2) * (amount weight) | Amount weight less than: ₩100,000: 1.00 ₩100,000 to ₩200,000: 1.04 ₩200,000 to ₩300,000: 1.08 ₩300,000 to ₩400,000: 1.12 ₩400,000 to ₩500,000: 1.16 |

As shown in Table 13, as an amount becomes larger, a purchase credit with an evaluation of less than 40 points is reduced more in the same compensation. For example, when a purchaser having a 50% purchase credit provides a satisfaction evaluation of 0 after purchasing a ₩ 500,000 service product of a 50% compensation range, a compensation is ₩ 125,000(=0.5*0.5*1.0*₩ 500,000). When there is no amount weight, based on Table 12, a purchase credit is reduced by −25% but if there is an amount weight, the purchase credit is reduced by −29%, based on Table 13, so that it becomes 21%. That is, as the purchase credit is reduced more by 4%, a total compensation limitation is reduced to ₩ 20,000(=₩ 5,000*4).

What is claimed is:

1. A non-transitory computer-readable medium having embodied thereon a computer program for operating a differential payment system that is connected to a purchaser terminal that purchases services through the communication network, is comprised of:
   a membership information registration/management module that receives membership registration information from the purchaser terminal;
   a membership information storage member that stores membership information
   a credit evaluation/management module that generates a purchase credit of a purchaser using the purchaser's membership information that was inputted through the purchaser terminal;
   a service evaluation/management module that calculates the service evaluation score using the service evaluation information inputted from the purchaser terminal, after the service is provided to the purchaser; and
   an installment payment price calculation module that provides the service payment that is to be paid to the service supplier providing the service differentially, in proportion to the service evaluation score and the purchaser's purchase credit,
   wherein the credit evaluation/management module changes the purchaser's purchase credit score in inverse proportion to the service evaluation score that was based on the evaluation information that the purchaser inputted.

2. The non-transitory computer-readable medium of claim 1, wherein
   a service supplier terminal is connected to the non-transitory computer-readable medium,
   the membership information registration/management module receives the inputted membership registration information from the service supplier terminal and saves the membership information in the storage member,
   the credit evaluation/management module generates service credit information on the service supplier by using the membership information on the service supplier stored in the membership information storage member, the installment payment price calculation module calculates a ratio of a pre-installment to a post-installment according to the service credit information on the service supplier, the pre-installment being paid to the service supplier before providing the service, the post-installment being paid to the service supplier after providing the service.

3. An automatic compensation device that connects the service seller's seller terminal and the service purchaser's purchaser terminal through a communication network is comprised of:
- a membership information registration/management module that receives the membership information from the purchaser terminal;
- a product registration/search module that receives the service product information from the seller terminal;
- a purchase credit management module that sets the purchase credit information of a registered purchaser using the membership information registration/management module;
- a storage member for membership information that stores membership information and purchase credit information;
- a storage member for product information that stores service product information; and
- a compensation calculation/provision module calculating a compensation to be provided to the purchaser using a service evaluation information inputted from the purchaser terminal after the service is supplied and the set purchase credit information, changing the purchase credit according to the calculated compensation.

4. The automatic compensation device of claim 3, wherein the purchase credit is a numerical value data.

5. The automatic compensation device of claim 4, wherein the purchase credit management module decreases the purchase credit in proportion to the calculated compensation, and increases the purchase credit if there is no calculated compensation.

6. The automatic compensation device of claim 4, wherein the compensation calculation/provision module calculates the compensation in proportion to the numerical value of the purchase credit.

7. The automatic compensation device of claim 4, wherein the compensation calculation/provision module calculates the compensation and the purchase credit is a value greater than 0.

8. The automatic compensation device of claim 5, wherein the purchase credit management module decreases the purchase credit by a predetermined consistent numerical value per reference compensation, when decreasing the purchase credit in proportion to the calculated compensation.

9. The automatic compensation device of claim 3, wherein the storage member of the product information stores a sales price of the service product and a compensable range value of the sales price.

10. The automatic compensation device of claim 9, wherein the compensation range value is a percentage value of the sales price, and has a value that is equal to or less than 100% of the sales price.

11. The automatic compensation device of claim 10, wherein the compensation calculation/provision module calculates the compensation in proportion to the compensation range value.

12. The automatic compensation device of claim 10, wherein the compensation range value varies depending on which day of the week the purchaser receives the service.

13. The automatic compensation device of claim 4, wherein the service evaluation/management module calculates a service evaluation score according to the service evaluation information inputted from the purchaser terminal.

14. The automatic compensation device of claim 13, wherein the purchase credit management module increases the purchase credit if there is no calculated compensation.

15. The automatic compensation device of claim 5, wherein the purchase credit management module decreases the purchase credit, in cases where the calculated compensation is the same, there will be a greater decrease in the purchase credit for the service that has a larger price.

* * * * *